(12) United States Patent
Shen et al.

(10) Patent No.: US 12,099,141 B1
(45) Date of Patent: Sep. 24, 2024

(54) LASER DETECTION METHOD FOR PORT MACHINERY EQUIPMENT

(71) Applicant: Hangzhou Huaxin Mechanical and Electrical Engineering Co., Ltd., Hangzhou (CN)

(72) Inventors: Ce Shen, Hangzhou (CN); Yongchang Shi, Hangzhou (CN); Jiru Wang, Hangzhou (CN); Zhuohua Yin, Hangzhou (CN); Weidong Yang, Hangzhou (CN); Le Xia, Hangzhou (CN); Yungang Huang, Hangzhou (CN); Shuiming Wang, Hangzhou (CN); Long Jiang, Hangzhou (CN); Yuhao Shen, Hangzhou (CN)

(73) Assignee: Hangzhou Huaxin Mechanical and Electrical Engineering Co., Ltd., Hangzhou (CN)

( * ) Notice: Subject to any disclaimer, the term of this patent is extended or adjusted under 35 U.S.C. 154(b) by 0 days.

(21) Appl. No.: 18/419,918

(22) Filed: Jan. 23, 2024

(30) Foreign Application Priority Data

Jan. 3, 2024 (CN) .......................... 202410007392.8

(51) Int. Cl.
*G01S 7/48* (2006.01)
*G01S 7/481* (2006.01)
(Continued)

(52) U.S. Cl.
CPC ............ *G01S 7/4802* (2013.01); *G01S 17/89* (2013.01); *G01S 17/93* (2013.01); *G01S 7/4817* (2013.01); *G01S 7/51* (2013.01); *G01S 17/86* (2020.01)

(58) Field of Classification Search
CPC . G01S 17/89; G01S 17/93; G01S 7/51; G01S 17/86
See application file for complete search history.

(56) References Cited

U.S. PATENT DOCUMENTS

2021/0255329 A1  8/2021  Li
2023/0138784 A1  5/2023  Xiao
(Continued)

OTHER PUBLICATIONS

Qi, C. R., Yi, L., Su, H., & Guibas, L.J., "PointNet++: Deep Hierarchical Feature Learning on Point Sets in a Metric Space", arXiv: 1706.02413v1, 2017 (Year: 2017).*

(Continued)

*Primary Examiner* — Isam A Alsomiri
*Assistant Examiner* — Joseph C Fritchman
(74) *Attorney, Agent, or Firm* — Jeenam Park

(57) ABSTRACT

The present disclosure discloses a laser detection method for port machinery equipment including: providing with a laser radar device: selecting a suitable laser radar device and installing on the port machinery, ensuring that an installation position and angle of the device can provide a good detection range and field of view; emitting and receiving laser: emitting a laser beam and receiving reflected light signals by the laser radar device, emitting a pulsed laser beam by the laser radar device, forming a narrow beam of laser by focusing with an optical component. The laser detection method uses a Velodyne® VLP-32C infrared laser, which has high resolution and a large number of detection points, can provide high-precision laser data to more accurately describe a port environment and target objects. Through a PointNet++deep learning mode, global perception and analysis of laser data can be carried out to obtain target object information.

4 Claims, 4 Drawing Sheets

(51) Int. Cl.
  *G01S 7/51* (2006.01)
  *G01S 17/86* (2020.01)
  *G01S 17/89* (2020.01)
  *G01S 17/93* (2020.01)

(56) References Cited

U.S. PATENT DOCUMENTS

2023/0243666 A1* 8/2023 Geiger ............... G01C 21/3852
                                                              701/400
2024/0111051 A1* 4/2024 Gupta ................... G01S 17/89

OTHER PUBLICATIONS

Yang, J. Li, H., Campbell, D., & Jia, Y., "Go-ICP: A Globally Optimal Solution to 3D ICP Point-Set Registration", arXiv: 1605.03344v1, 2016 (Year: 2016).*

Dubois, A., "Making Ports Smarter and Safer with LiDAR solutions", Outsidght, 2023 (Year: 2023).*

Velodyne, "Velodyne Lidar ULTRA Puck", Velodyne, 2019 (Year: 2019).*

Sharda, A., "Image Filters: Gaussian Blur", Medium, 2021 (Year: 2021).*

Yuan, X., Chen, H., & Liu, B., "Point cloud clustering and outlier detection based on spatial neighbor connected region labeling", Measurement and Control, 54 (5-6, 835-844, 2021 (Year: 2021).*

Pomerleau, F., Colas, F., and Siegwart, R., "A Review of Point Cloud Registration Algorithms for Mobile Robotics" Foundations and Trends in Robtics, 4 (1), 1-104, 2013 (Year: 2013).*

* cited by examiner

LASER DETECTION METHOD FOR PORT MACHINERY EQUIPMENT

CROSS-REFERENCE TO RELATED APPLICATIONS

This application claims priority to Chinese Patent Application No. 202410007392.8, filed on Jan. 3, 2024, which is hereby incorporated by reference in its entirety.

TECHNICAL FIELD

The present disclosure relates to the field of lidar detection technologies, and in particular, to a laser detection method for port machinery equipment.

BACKGROUND

Lidar is used to detect and determine position, shape, distance, and motion status of a target object by emitting a laser beam and receiving a reflected light signal. In a port environment, the lidar can be installed on a port machinery to detect the position and distance of ships, yards, dock facilities, and other objects, helping a port operator achieve precise position control and collision avoidance. However, existing laser detection methods used for port machinery equipment have poor data accuracy and precision during a detection process, which leads to an inability of the methods to accurately describe the port environment and target objects during use. At the same time, there are difficulties in detecting and classifying complex targets and densely stacked goods, resulting in easy misidentification and misjudgment of targets, misdetection, and decreased classification accuracy, thereby affecting a safety of port equipment, work efficiency and performance, as well as a complexity of the methods in data processing, seriously affect an efficiency of the methods in the detection process and bring inconvenience to a user.

SUMMARY

A purpose of the present disclosure is to outline some aspects of the embodiments of the present disclosure and briefly introduce some preferred embodiments. Some simplification or omission may be made in this description, as well as in the abstract of the specification and the title of the present disclosure, to avoid blurring the purpose of this description, abstract of the specification, and the title of the present disclosure, and such simplification or omission cannot be used to limit the scope of the present disclosure.

Considering a phenomenon of poor data accuracy and precision in the above or existing technologies, which renders it difficult for the method to accurately describe the port environment and target objects when used, as well as a difficulty in detecting and classifying complex targets and densely stacked goods, resulting in easy misidentification and misjudgment of targets, misdetection, and decreased classification accuracy, thereby affecting a safety, work efficiency, and performance of a port equipment, and the method is relatively complex in a data processing process, which seriously affects an efficiency of the method in the detection process and brings inconvenience to a user.

To achieve the above objectives, the present disclosure provides the following technical solution.

A laser detection method for port machinery equipment, including the following steps:

S1. providing with a laser radar device: selecting a suitable laser radar device and installing on the port machinery, ensuring an installation position and angle of the device can provide a good detection range and field of view;

S2. emitting and receiving laser: emitting a laser beam and receiving reflected light signals by the laser radar device, emitting a pulsed laser beam by the laser radar device, forming a narrow beam of laser by focused with an optical component;

S3. receiving reflected signals: receiving these reflected signals by a laser radar receiver, converting into electrical signals when the laser beam is irradiated on a target object and some of the light signals will be reflected back by the target object;

S4. processing data and analyzing: processing and analyzing received electrical signals to extract information of position, shape, distance, and motion status of the target object;

S5. recognizing and classing a target: performing target recognition and classification based on processed data, classing the target through the shape, motion characteristics of the target to provide more accurate information and decision support;

S6. visualizing and alarming: displaying information of a detected target object in a visual form to a port operator, which can be achieved through a display screen, an image, or a real-time image; triggering an alarm mechanism to promptly notify the operator to take corresponding measures when a potential collision risk or an abnormal situation is detected.

As a further solution of the present disclosure, the laser radar device in step S1 is an infrared laser in a model of Velodyne® VLP-32C, with a working wavelength of around 905 nanometers, and a rotating scanning design being used in the Velodyne® VLP-32C infrared laser to achieve scanning in a 360-degree horizontal field of view angle and vertical direction.

As a further embodiment of the present disclosure, in step S4, a PointNet++deep learning model is used, algorithms required in a process of processing data and analyzing includes transformation robustness level estimation, Gaussian filtering, and growth algorithm.

As a further solution of the present disclosure, in step S4, the transformation robustness level estimation algorithm used is Go ICP algorithm, and an algorithm formula in a cloud registration process is as follows:

input:
source point cloud: $P\_src = \{p\_1, p\_2, \ldots, p\_n\}$;
target point cloud: $P\_tgt = \{q\_1, q\_2, \ldots, q\_m\}$;
initial transformation matrix: $T\_init$;
output:
optimal rigid transformation matrix: $T\_opt$;
algorithm steps:
initialization: $T\_cur = T\_init$;
repeating an iteration until a termination condition is met:
a. transform source point cloud: $P\_src' = T\_cur * P\_src$;
b. finding a nearest neighbor point $q\_j$ in the target point cloud for each point $p\_i$ in the source point cloud;
c. calculating a distance (such as Euclidean distance) $d\_{ij}$ between each pair of corresponding points;
d. calculating a weight $w\_{ij}$: $w\_{ij} = \exp(-d\_{ij}^2 / \sigma^2)$, where sigma is a parameter that controls a decay rate of the weight;
e. calculating a weighted centroid corresponding to each point:

weighted centroid of source point cloud: C_src=(1/sum (w_ij))*sum (w_ij*p_i);
target point cloud weighted centroid: C_tgt=(1/sum (w_ij))*sum (w_ij*q_j);
f. calculating a covariance matrix H and a rotation matrix R:

$$H=\text{sum }(w\_ij*(p\_i-C\_src)*(q\_j-C\_tgt)\hat{}T);$$

decomposing the covariance matrix H into H=U*Σ*V^T with a singular value decomposition (SVD);
calculating the rotation matrix R=V*U^T;
g. calculating a translation vector t: t=C_tgt−R*C_src;
h. constructing a new transformation matrix T_new=[R, t; 0, 1];
i. updating a current transformation matrix: T_cur=T_new;
returning the optimal rigid transformation matrix: T_opt=T_cur;
where:
P_src: source point cloud dataset, representing point cloud data obtained from a laser scanner or a sensor for object detection and analysis;
P_tgt: target point cloud dataset, representing reference point cloud of the target object or scene, such as the port equipment and goods;
p_i, q_j: representing coordinates or features of specific points in the source point cloud P_src and target point cloud P_tgt;
T_init: initial transformation matrix, configured to initialize an initial alignment state with the target point cloud;
T_cur: current transformation matrix, representing a current alignment state;
T_new: new transformation matrix that obtains a more accurate alignment state through an iterative optimization calculation;
T_opt: the optimal rigid transformation matrix, representing an optimal alignment state after an iterative optimization.

As a further solution of the present disclosure, in step S4, the Gaussian filtering algorithm is configured to smooth laser point cloud data and includes the following:
input:
original point cloud data: P={p_1, p_2, . . . , p_n};
standard deviation of Gaussian function: sigma;
output:
point cloud data after smooth processing: P_smoothed={p'_1, p'_2, . . . , p'_n};
algorithm steps:
processing for each point p_i:
a. constructing a local neighborhood window with p_i as a center, it is a point cloud domain in a fixed size or a window in a variable size based on a distance;
b. calculating a weight of each point within a neighborhood window, calculating a Gaussian weight based on a distance from a point to a center point;
c. applying the Gaussian weight to all points within the neighborhood window for weighted averaging, calculating point coordinates p'_i after smoothing;
a specific algorithm formula is as follows:

$$\text{a Gaussian weight coefficient } w\_i=\exp(-d\_i\hat{}2/(2*sigma\hat{}2));$$

where, d_i represents a distance from a point p_i to a center of the window, sigma is the standard deviation of Gaussian function;
a calculation formula for the coordinate of a point after smoothing is:

$$p'\_i=(1/W)*\text{sum }(w\_i*p\_i);$$

where, W represents a cumulative sum of weights:
W=sum (w_i).

As a further solution of the present disclosure, in step S4, the growth algorithm is configured to segment and cluster point cloud, and includes the following:
input:
original point cloud data: P={p_1, p_2, . . . , p_n};
growth algorithm parameters: such as neighborhood size threshold, neighborhood distance threshold, etc;
output:
segmented point cloud data: comprising different point cloud clusters or regions;
algorithm steps:
initializing:
constructing an empty list of point cloud cluster;
marking all points as an unvisited state;
processing all unvisited points p_i:
a. constructing a new point cloud cluster C and adding a current point p_i to C;
b. marking the current point p_i as a visited state;
c. growing by a neighborhood search method with p_i as a seed point:
traversing point p_j within a neighborhood p_i:
when p_j has not been visited and meets the growth condition, adding it to C and marking as the visited state;
determining whether the growth condition is met based on neighborhood size threshold, neighborhood distance threshold, or other conditions;
repeating the above steps until all points have been visited;
returning a list of segmented point cloud clusters, each cluster representing a cluster or a region.

As a further solution of the present disclosure, in step S5, the laser radar data and camera images are projected and aligned on a corresponding point cloud with a combination of multimodal data fusion technology, and then target recognition and classification are carried out with image processing and computer vision algorithms.

As a further solution of the present disclosure, in step S5, in a process of using the multimodal data fusion technology, the method further includes the following steps:
S5.1: Obtaining Data:
obtaining laser radar data: obtaining point cloud data in an environment to obtain position and reflection intensity information of each point by the laser radar device;
obtaining camera image data: capturing scene images in the environment by a camera;
S5.2: Projecting and Aligning the Point Cloud:
projecting the laser radar point cloud data onto an image plane: based on internal and external parameters of the camera, projecting three-dimensional coordinates of each point in the point cloud onto the image plane of the camera to obtain corresponding pixel coordinates of each point on the image;
aligning the laser radar point cloud and camera images: aligning the laser radar point cloud and the camera image by a feature matching method to match or overlap geometrically;
S.5.3: Recognizing and Classing the Target:
image processing and computer vision algorithms: detecting and classifying camera images with image processing and computer vision algorithms, extracting features such as color, texture, and shape of the target;

extracting feature of a corresponding point cloud: extracting the features of the point cloud based on the position, reflection intensity, and other information of each corresponding point in aligned laser radar point cloud;

multimodal data fusion: fusing target features in the camera images with corresponding point cloud features, which can be achieved through feature fusion between point clouds and images.

Compared with prior art, the beneficial effects of the present disclosure are the following:

1. The present disclosure utilizes a Velodyne® VLP-32C infrared laser, which has high resolution and a large number of detection points, which can provide high-precision laser data to more accurately describe a port environment and target objects. Through a PointNet++deep learning model, global perception and analysis of laser data can be carried out to obtain target object information in a scene, in combined with a multimodal data fusion technology, the laser data is fused with data from other sensors (camera images) so as to provide more comprehensive and accurate target information.

2. The present disclosure utilizes transformation robustness level estimation to perform coordinate transformation and denoising on the laser data, thereby improving the quality of the data. The Gaussian filtering algorithm can further smooth the data, reduce noise and unnecessary details, and the growth algorithm can segment and cluster the laser data, classify points in continuous areas as a same target, and provide a more accurate target segmentation result.

3. The present disclosure combines deep learning models and multimodal data fusion technology to more effectively utilize the laser data and other sensor data in target classification and recognition. Multimodal data fusion can comprehensively utilize the color, texture, and shape features of images, as well as the position and reflection intensity features of the laser data, so as to improve an accuracy and robustness of the target classification.

DESCRIPTION OF EMBODIMENTS

To make the above objectives, features, and advantages of the present disclosure more obvious and easy to understand, a detailed explanation of the specific embodiments of the present disclosure will be provided below in combination with the drawings.

Many specific details are elaborated in the following description to facilitate a full understanding of the present disclosure. However, the present disclosure can also be implemented in other ways different from those described herein. Those skilled in the art can make similar promotions without violating the content of the present disclosure. Therefore, the present disclosure is not limited by the specific embodiments disclosed below.

Secondly, term "one embodiment" or "embodiments" referred to here refers to specific features, structures, or features that can be included in at least one implementation mode of the present disclosure. Term "in one embodiment" used in different parts of this specification does not necessarily refer to the same embodiment, nor is it a separate or selective embodiment that is mutually exclusive to other embodiments.

Embodiment 1

Figure 1:
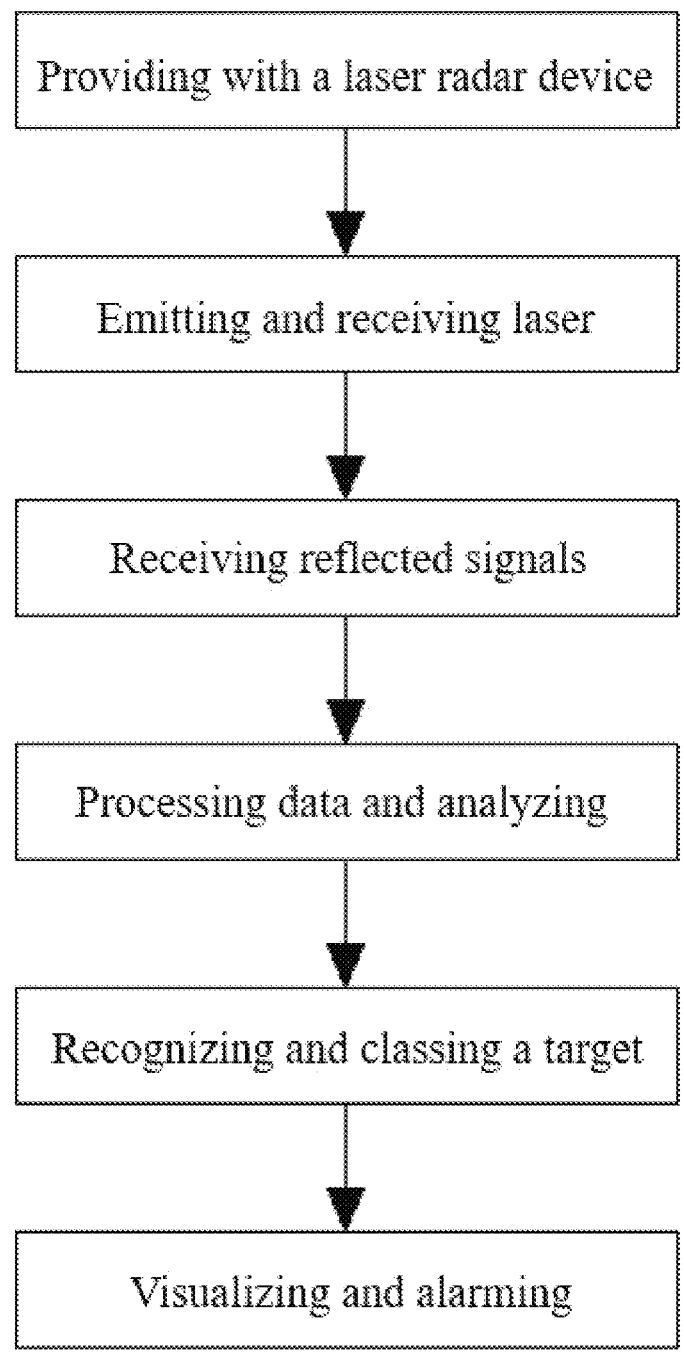
FIGS. 1-5 illustrate operational steps of a laser detection method for port machinery equipment.
Figure 2:
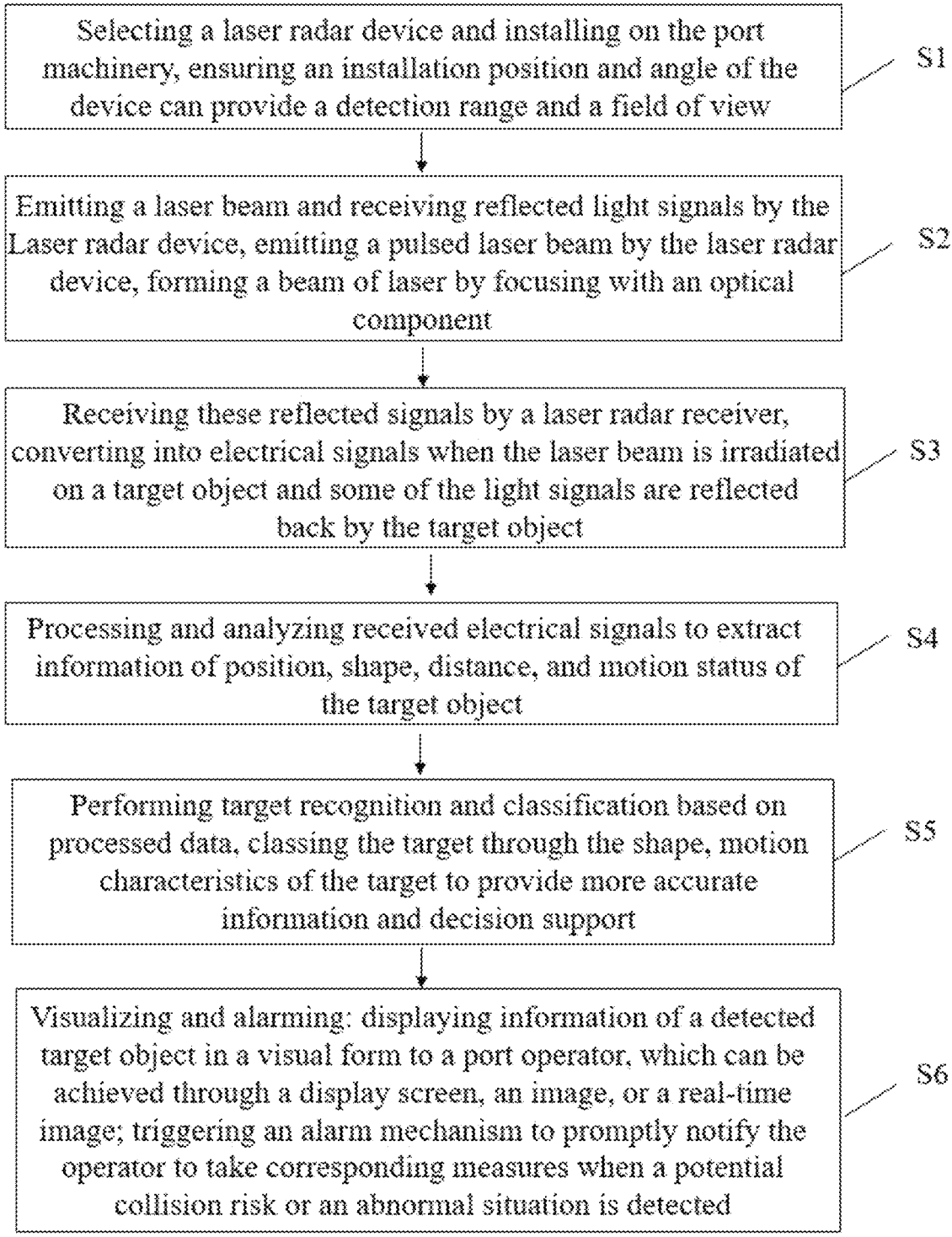
Figure 3:
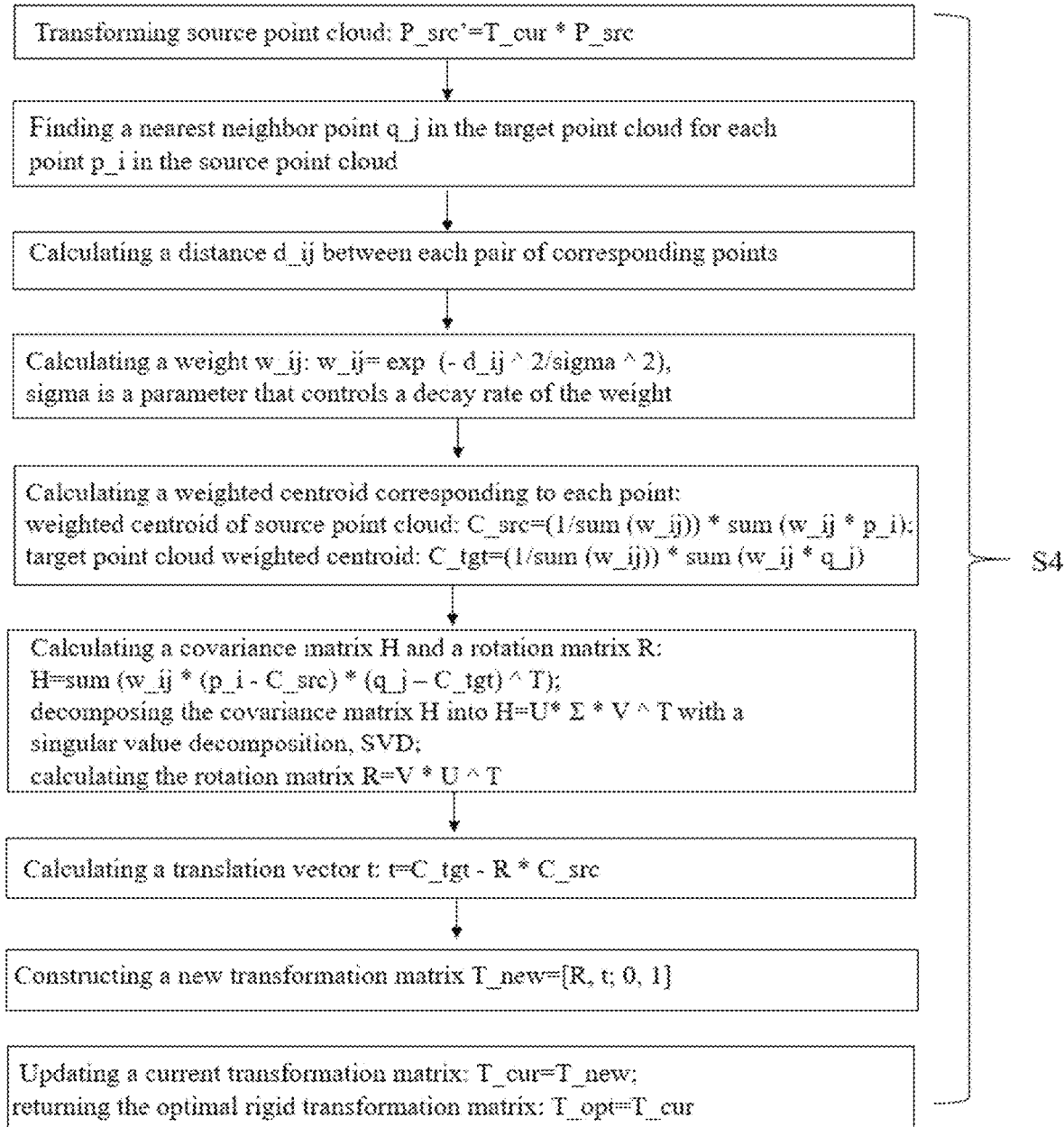
Figure 4:
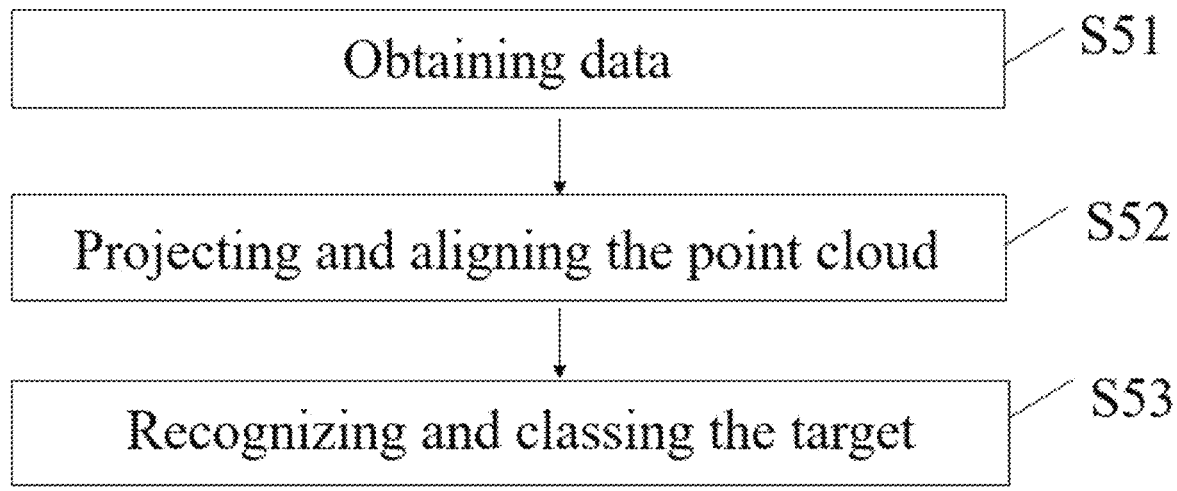
Figure 5:
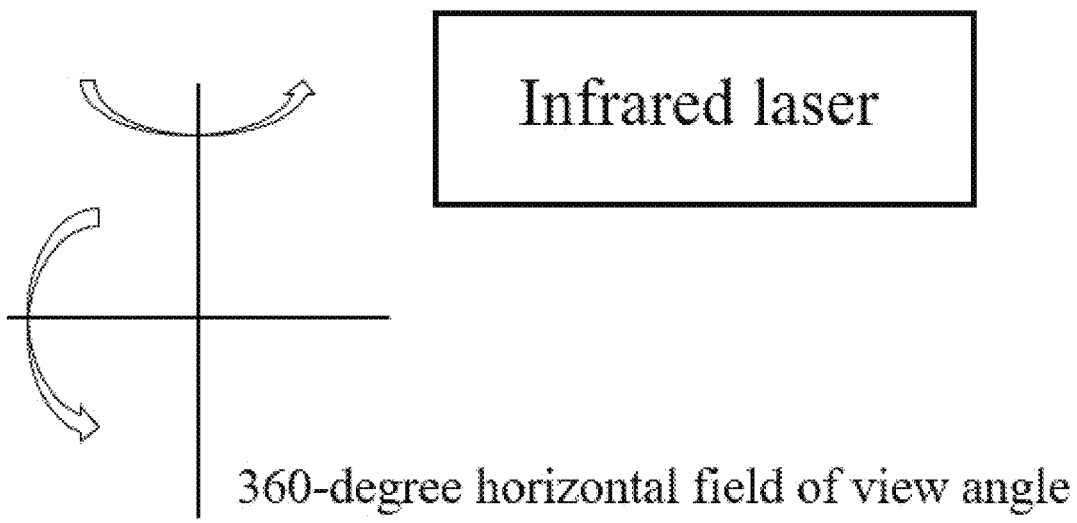

Please refer to FIGS. 1-5 illustrating a first embodiment of the present disclosure. This embodiment provides a laser detection method for port machinery equipment, and the operation steps are as follows:

S1. providing with a laser radar device: selecting a suitable laser radar device and installing on the port machinery, ensuring an installation position and angle of the device can provide a good detection range and field of view;

S2. emitting and receiving laser: emitting a laser beam and receiving reflected light signals by the laser radar device, emitting a pulsed laser beam by the laser radar device, forming a narrow beam of laser by focused with an optical component;

S3. receiving reflected signals: receiving these reflected signals by a laser radar receiver, converting into electrical signals when the laser beam is irradiated on a target object and some of the light signals will be reflected back by the target object;

S4. processing data and analyzing: processing and analyzing received electrical signals to extract information of position, shape, distance, and motion status of the target object;

S5. recognizing and classing a target: performing target recognition and classification based on processed data, classing the target through the shape, motion characteristics of the target to provide more accurate information and decision support;

S6. visualizing and alarming: displaying information of a detected target object in a visual form to a port operator, which can be achieved through a display screen, an image, or a real-time image; triggering an alarm mechanism to promptly notify the operator to take corresponding measures when a potential collision risk or an abnormal situation is detected.

Specifically, the laser radar device in step S1 is an infrared laser in a model of Velodyne® VLP-32C, with a working wavelength of around 905 nanometers, and a rotating scanning design being used in the Velodyne® VLP-32C infrared laser to achieve scanning in a 360-degree horizontal field of view angle and vertical direction.

TABLE 1

| Data comparison | Velodyne ® VLP-32C infrared laser | Ordinary laser radar |
| --- | --- | --- |
| Accuracy and Resolution | High precision, with higher angular resolution (usually 0.09°) | Generally, the accuracy is low, and the angular resolution is usually high (such as 1° or higher) |
| Density of detection point | Providing a large number of detection points with high point cloud density | Relatively fewer detection points with lower point cloud density |
| Scan range | Usually having a wide scanning range (e.g. 360° horizontal, +/−30° vertical) | Relatively small scanning range and cannot fully cover the horizontal and vertical directions |

TABLE 1-continued

| Data comparison | Velodyne ® VLP-32C infrared laser | Ordinary laser radar |
|---|---|---|
| Reflection Intensity | Providing reflection intensity information for each detection point | Some traditional laser radars may not be able to provide reflection intensity information |
| Installation and configure | Large size and weight, requiring specialized brackets and wiring | Relatively compact and lightweight, easy to install and configure |
| Cost | Relatively high | Relatively low |
| Application area | Multiple fields including aviation, unmanned driving, robotics, 3D modeling, etc. | Autonomous driving, robotics, industrial surveying and mapping, and other fields |

Specifically, in step S4, a PointNet++deep learning model is used, algorithms required in a process of processing data and analyzing includes transformation robustness level estimation, Gaussian filtering, and growth algorithm.

As a further solution of the present disclosure, in step S4, in step S4, the transformation robustness level estimation algorithm used is Go ICP algorithm, and an algorithm formula in a cloud registration process is as follows:
input:
source point cloud: P_src={p_1, p_2, . . . , p_n};
target point cloud: P_tgt={q_1, q_2, . . . , q_m};
initial transformation matrix: T_init;
output:
optimal rigid transformation matrix: T_opt;
algorithm steps:
initialization: T_cur=T_init;
repeating an iteration until a termination condition is met:
a. transform source point cloud: P_src'=T_cur*P_src;
b. finding a nearest neighbor point q_j in the target point cloud for each point p_i in the source point cloud;
c. calculating a distance (such as Euclidean distance) d_ij between each pair of corresponding points;
d. calculating a weight w_ij: w_ij=exp (−d_ij^2/sigma^2), where sigma is a parameter that controls a decay rate of the weight;
e. calculating a weighted centroid corresponding to each point:
weighted centroid of source point cloud: C_src=(1/sum (w_ij))*sum (w_ij*p_i);
target point cloud weighted centroid: C_tgt=(1/sum (w_ij))*sum (w_ij*q_j);
f. calculating a covariance matrix H and a rotation matrix R:

$$H=\text{sum } (w\_ij*(p\_i-C\_src)*(q\_j-C\_tgt)^T);$$

decomposing the covariance matrix H into H=U*2*V^T with a singular value decomposition (SVD);
calculating the rotation matrix R=V*U^T;
g. calculating a translation vector t: t=C_tgt−R*C_src;
h. constructing a new transformation matrix T_new=[R, t; 0, 1];
i. updating a current transformation matrix: T_cur=T_new;
returning the optimal rigid transformation matrix: T_opt=T_cur;
where:
P_src: source point cloud dataset, representing point cloud data obtained from a laser scanner or a sensor for object detection and analysis;
P_tgt: target point cloud dataset, representing reference point cloud of the target object or scene, such as the port equipment and goods;
p_i, q_j: representing coordinates or features of specific points in the source point cloud P_src and target point cloud P_tgt;
T_init: initial transformation matrix, configured to initialize an initial alignment state with the target point cloud;
T_cur: current transformation matrix, representing a current alignment state;
T_new: new transformation matrix that obtains a more accurate alignment state through an iterative optimization calculation;
T_opt: the optimal rigid transformation matrix, representing an optimal alignment state after an iterative optimization.

Furthermore, a transformation robustness level estimation, coordinate transformation and denoising processing can be performed on the laser data to improve data quality.

Specifically, in step S4, the Gaussian filtering algorithm is configured to smooth the laser point cloud data, and includes as following:
input:
original point cloud data: P={p_1, p_2, . . . , p_n};
standard deviation of Gaussian function: sigma;
output:
point cloud data after smooth processing: P_smoothed={p'_1, p'_2, . . . , p'_n};
algorithm steps:
processing for each point p_i:
a. constructing a local neighborhood window with p_i as a center, it is a point cloud domain in a fixed size or a window in a variable size based on a distance;
b. calculating a weight of each point within a neighborhood window, calculating a Gaussian weight based on a distance from a point to a center point;
c. applying the Gaussian weight to all points within the neighborhood window for weighted averaging, calculating point coordinates p'_i after smoothing;
a specific algorithm formula is as follows:

$$\text{a Gaussian weight coefficient } w\_i=\exp(-d\_i^2/(2*\text{sigma}^2));$$

where, d_i represents a distance from a point p_i to a center of the window, sigma is the standard deviation of Gaussian function;
a calculation formula for the coordinate of a point after smoothing is:

$$p'\_i=(1/W)*\text{sum } (w\_i*p\_i);$$

where, W represents a cumulative sum of weights:
W=sum (w_i).

Furthermore, a use of the Gaussian filtering algorithm can further smooth the data, reduce noise and unnecessary details.

Specifically, in step S4, the growth algorithm is configured to segment and cluster point cloud, and includes the following:

input:
original point cloud data: P={p_1, p_2, . . . , p_n};
growth algorithm parameters: such as neighborhood size threshold, neighborhood distance threshold, etc;
output:
segmented point cloud data: comprising different point cloud clusters or regions;
algorithm steps:
initializing:
constructing an empty list of point cloud cluster;
marking all points as an unvisited state;
processing all unvisited points p_i:
a. constructing a new point cloud cluster C and adding a current point p_i to C;
b. marking the current point p_i as a visited state;
c. growing by a neighborhood search method with p_i as a seed point:
traversing point p_j within a neighborhood p_i:
when p_j has not been visited and meets the growth condition, adding it to C and marking as the visited state;
determining whether the growth condition is met based on neighborhood size threshold, neighborhood distance threshold, or other conditions;
repeating the above steps until all points have been visited;
returning a list of segmented point cloud clusters, each cluster representing a cluster or a region.

Furthermore, by using growth algorithms, the laser data can be segmented and clustered, points in continuous regions are classified into a same target, thereby providing a more accurate target segmentation result.

Specifically, in step S5, the laser radar data and camera images are projected and aligned on a corresponding point cloud with a combination of multimodal data fusion technology, and then target recognition and classification are carried out with image processing and computer vision algorithms.

Specifically, in step S5, in a process of using the multimodal data fusion technology, the method further includes the following steps:
S5.1: Obtaining Data:
  obtaining laser radar data: obtaining point cloud data in an environment to obtain position and reflection intensity information of each point by the laser radar device;
  obtaining camera image data: capturing scene images in the environment by a camera;
S5.2: Projecting and Aligning the Point Cloud:
  projecting the laser radar point cloud data onto an image plane: based on internal and external parameters of the camera, projecting three-dimensional coordinates of each point in the point cloud onto the image plane of the camera to obtain corresponding pixel coordinates of each point on the image;
  aligning the laser radar point cloud and camera images: aligning the laser radar point cloud and the camera image by a feature matching method to match or overlap geometrically;
S.5.3: Recognizing and Classing the Target:
  image processing and computer vision algorithms: detecting and classifying camera images with image processing and computer vision algorithms, extracting features such as color, texture, and shape of the target;
  extracting feature of a corresponding point cloud: extracting the features of the point cloud based on the position, reflection intensity, and other information of each corresponding point in aligned laser radar point cloud;
  multimodal data fusion: fusing target features in the camera images with corresponding point cloud features, which can be achieved through feature fusion between point clouds and images.

Furthermore, by combining a deep learning model and a multimodal data fusion technique, the laser data and other sensor data can be more effectively utilized in target classification and recognition. Multimodal data fusion can comprehensively utilize the color, texture, and shape features of images, as well as the position and reflection intensity features of laser data so as to improve an accuracy and robustness of target classification.

When in use, the Velodyne® VLP-32C infrared laser is used for laser scanning, three-dimensional point cloud data of a surrounding environment for port equipment is obtained through laser scanning, the transformation robustness level in the data preprocessing stage is estimated, coordinate transformation on the laser data is performed to ensure accuracy and consistency, and then the Gaussian filtering is performed to smooth the data and reduce the influence of noise and outliers, the PointNet++deep learning model is used for global perception and feature extraction of preprocessed point cloud data, growth algorithm is applied for target segmentation, point cloud data is segmented into independent target objects, and in combination with the multimodal data fusion technology to fuse the laser data with data from other sensors (such as camera images) to improve the accuracy of target recognition. A trained classification model is used, each target object is classified and recognized, and relevant attribute information for each target is extracted.

In summary, by using the Velodyne® VLP-32C infrared laser, which has high resolution and a large number of detection points, which can provide high-precision laser data, more accurately describe the port environment and target objects. Through the PointNet++deep learning model, global perception and analysis of the laser data can be carried out to obtain target object information in the scene. Combined with multimodal data fusion technology, laser data is integrated with data from other sensors (camera images), a more comprehensive and accurate target information can be provided. By using transformation robustness level estimation, coordinate transformation and denoising can be performed on the laser data to improve data quality. The Gaussian filtering algorithm can further smooth data, reduce noise and unnecessary details, and the growth algorithm can segment and cluster the laser data, points in continuous regions is classified as the same target to provide a more accurate segmentation result. By combining with the deep learning model and the multimodal data fusion technique, the laser data and other sensor data can be more effectively utilized in target classification and recognition. Multimodal data fusion can comprehensively utilize the color, texture, and shape features of images, as well as the position and reflection intensity features of laser data, thereby improving an accuracy and robustness of target classification.

It is important to note that the construction and arrangement shown in multiple different exemplary embodiments of the present application are only illustrative. Although only a few embodiments have been described in detail in the present disclosure, those who refer to this filed should easily understand that many modifications are possible (such as the size, scale, structure, shape and proportion of various components, as well as parameter values (such as temperature, pressure, etc.), installation arrangement, material used, color, change of direction.), without deviating from the technical solution and advantages described in the present application. For example, components shown as an integrally formed can be composed of multiple parts or elements, the position of the components can be inverted or changed in other ways, and the properties or number or position of discrete components can be changed or altered. Therefore, all such modifications are intended to be included within the scope of the present disclosure. The order or sequence of any process or method step can be changed or reordered based on alternative embodiments. In the claims, any provision of "device plus function" is intended to cover the structure described herein for performing the function and is not only structurally equivalent but also equivalent structural. Other substitutions, modifications, changes, and omissions may be made in the design, operation, and arrangement of exemplary embodiments without departing from the scope of the present disclosure. Therefore, the present disclosure is not limited to specific embodiments, but extends to various modifications that still fall within the scope of the attached claims.

Furthermore, in order to provide a concise description of exemplary embodiments, all features of the actual embodiment may not be described (i.e., those features that are not relevant to the currently considered best mode of executing the present disclosure, or those features that are not relevant to implementing the present disclosure).

It should be understood that in the development process of any practical embodiment, such as in any engineering or design project, a large number of specific embodiment decisions can be made. Such development efforts may be complex and time-consuming, but for ordinary technical personnel who benefit from the present disclosure, there is no need for too much experimentation. Such development efforts will be a routine task of design, manufacturing, and production.

It should be noted that the above embodiments are only used to illustrate the technical solution of the present disclosure and not to limit it. Although the present disclosure has been described in detail with reference to preferred embodiments, ordinary technical personnel in the art should understand that the technical solution of the present disclosure can be modified or equivalently replaced without departing from the spirit and scope of the technical solution of the present disclosure, which should be covered within the scope of the claims of the present disclosure.

What is claimed is:

1. A laser detection method for port machinery equipment, wherein comprising the following steps:
S1: providing with a laser radar device: selecting a laser radar device and installing on the port machinery, ensuring an installation position and angle of the device can provide a detection range and a field of view;
S2: emitting and receiving laser: emitting a laser beam and receiving reflected light signals by the laser radar device, emitting a pulsed laser beam by the laser radar device, forming a beam of laser by focusing with an optical component;
S3: receiving reflected signals: receiving these reflected signals by a laser radar receiver, converting into electrical signals when the laser beam is irradiated on a target object and some of the light signals are reflected back by the target object;
S4: processing data and analyzing: processing and analyzing received electrical signals to extract information of position, shape, distance, and motion status of the target object;
S5: recognizing and classing a target: performing target recognition and classification based on processed data, classing the target through the shape, motion characteristics of the target to provide more accurate information and decision support;
S6: visualizing and alarming: displaying information of a detected target object in a visual form to a port operator, which can be achieved through a display screen, an image, or a real-time image; triggering an alarm mechanism to promptly notify the operator to take corresponding measures when a potential collision risk or an abnormal situation is detected,
wherein in step S4, a PointNet++deep learning model is used, and algorithms for the process of processing data and analyzing comprises transformation robustness level estimation, Gaussian filtering, and growth algorithms,
wherein the transformation robustness level estimation algorithm in step S4 comprises Go-ICP algorithm, and an algorithm formula comprised in the Go-ICP algorithm comprised in a cloud registration process comprises:
input:
source point cloud: P_src={p_1, p_2, . . . , p_n};
target point cloud: P_tgt={q_1, p_2, . . . , q_m};
initial transformation matrix: T_init;
output:
optimal rigid transformation matrix: T_opt;
algorithm steps:
initialization: T_cur=T_init;
repeating an iteration until a termination condition is met:
a: transforming source point cloud: P_src'=T_cur*P_src;
b: finding a nearest neighbor point q_j in the target point cloud for each point p_i in the source point cloud;
c: calculating a distance d_ij between each pair of corresponding points;
d: calculating a weight w_ij: w_ij=exp (−d_ij^2/sigma^2), wherein sigma is a parameter that controls a decay rate of the weight;
e: calculating a weighted centroid corresponding to each point:
weighted centroid of source point cloud: C_src=(1/sum (w_ij))*sum (w_ij*p_i);
target point cloud weighted centroid: C_tgt=(1/sum (w_ij) *sum (w_ij*g_j);
f: calculating a covariance matrix H and a rotation matrix R:

$$H=\text{sum } (w\_ij*(p\_i-C\_src)*(q\_j-C\_tgt)^T);$$

decomposing the covariance matrix H into H=U*Σ*V^T with a singular value decomposition, SVD;
calculating the rotation matrix R=V*U^T;
g: calculating a translation vector t: t=C_tgt−R*C_src;
h: constructing a new transformation matrix T_new=[R, t; 0, 1];
i: updating a current transformation matrix: T_cur=T_new;
returning the optimal rigid transformation matrix: T_opt=T_cur;
wherein:
P_src: source point cloud dataset, representing point cloud data obtained from a laser scanner or a sensor for object detection and analysis;
P_tgt: target point cloud dataset, representing reference point cloud of the target object or scene;

p_i, q_i: representing coordinates or features of specific points in the source point cloud P_src and target point cloud P_tgt;

T_init: initial transformation matrix, configured to initialize an initial alignment state with the target point cloud;

T_cur: current transformation matrix, representing a current alignment state;

T_new: new transformation matrix that obtains a more accurate alignment state through an iterative optimization calculation;

T_opt: the optimal rigid transformation matrix, representing an optimal alignment state after an iterative optimization, wherein the Gaussian filtering algorithm is configured to smooth laser point cloud data and comprises the following:

input:

original point cloud data: P={p_1, p_2, . . . , p_n};

standard deviation of Gaussian function: sigma;

output:

point cloud data after smooth processing: P_smoothed={p'_1, p'_2, . . . , p'_n};

algorithm steps:

processing for each point p_i:

a: constructing a local neighborhood window with p_i as a center, the local neighborhood window being a point cloud domain in a fixed size or a window in a variable size based on a distance;

b: calculating a weight of each point within the neighborhood window, calculating a Gaussian weight based on a distance from a point to a center point;

c: applying the Gaussian weight to all points within the neighborhood window for weighted averaging, calculating point coordinates p'_i after smoothing;

a specific algorithm formula is as follows:

a Gaussian weight coefficient w_i=exp(−d_i^2/(2*sigma^2));

wherein, d_i represents a distance from a point p_i to a center of the window, sigma is the standard deviation of Gaussian function;

a calculation formula for the coordinate of a point after smoothing is:

p'_i=(1/W)*sum (w_i*p_i);

wherein, W represents a cumulative sum of weights: W=sum (w_i), wherein the growth algorithm is configured to segment and cluster point cloud, and comprises the following:

input:

original point cloud data: P={p_1, p_2, . . . , p_n};

growth algorithm parameters, comprising neighborhood size threshold, neighborhood distance threshold;

output:

segmented point cloud data comprising different point cloud clusters or regions;

algorithm steps:

initializing:

constructing an empty list of point cloud cluster;

marking all points as an unvisited state;

processing all unvisited points p_i:

a: constructing a new point cloud cluster C and adding a current point p_i to C;

b: marking the current point p_i as a visited state;

c: growing by a neighborhood search method with p_i as a seed point:

traversing point p_i within a neighborhood p_i:

when p_j has not been visited and meets a growth condition, adding p_j to C and marking as the visited state;

determining whether the growth condition is met based on a condition comprising neighborhood size threshold and neighborhood distance threshold;

repeating the above steps until all points have been visited;

returning a list of segmented point cloud clusters, each segmented point cloud cluster representing a cluster or a region, wherein in step S5, the laser radar data and camera images are projected and aligned on a corresponding point cloud with a combination of multimodal data fusion technology, and then target recognition and classification are carried out with image processing and computer vision algorithms, wherein in step S5, in a process of using the multimodal data fusion technology, the method further comprises the following steps:

S51: obtaining data:

obtaining laser radar data: obtaining point cloud data in an environment to obtain position and reflection intensity information of each point by the laser radar device;

obtaining camera image data: capturing scene images in the environment by a camera;

S52: projecting and aligning the point cloud:

projecting the laser radar point cloud data onto an image plane: based on internal and external parameters of the camera, projecting three-dimensional coordinates of each point in the point cloud onto the image plane of the camera to obtain corresponding pixel coordinates of each point on the image;

aligning the laser radar point cloud and camera images: aligning the laser radar point cloud and the camera image by a feature matching method to match or overlap geometrically;

S53: recognizing and classing the target:

image processing and computer vision algorithms: detecting and classifying camera images with image processing and computer vision algorithms, extracting features comprising color, texture, and shape of the target;

extracting features of a corresponding point cloud: extracting the features of the point cloud based on information comprising the position and reflection intensity of each corresponding point in aligned laser radar point cloud;

multimodal data fusion: fusing target features in the camera images with corresponding point cloud features, which can be achieved through feature fusion between point clouds and images.

2. The laser detection method for port machinery equipment according to claim 1, wherein the laser radar device in step S1 is an infrared laser with a working wavelength of 905 nanometers, and a rotating scanning design being used in the infrared laser to achieve scanning in a 360-degree horizontal field of view angle and a vertical direction.

3. The laser detection method for port machinery equipment according to claim 1, wherein the step c: calculating a distance d_ij between each pair of corresponding points comprises calculating a Euclidean distance.

4. The laser detection method for port machinery equipment according to claim 1, wherein the target object or scene comprises port equipment and goods.

* * * * *